United States Patent [19]

Takeuchi et al.

[11] Patent Number: 5,576,850
[45] Date of Patent: Nov. 19, 1996

[54] IMAGE MEMORY EDITING APPARATUS

[75] Inventors: Yoshiyasu Takeuchi, Tokyo; Kozi Hatano, Yokohama, both of Japan; Masaki Kiyono, Cheshire, United Kingdom; Ryuji Yasukohchi; Hayashi Ito, both of Tokyo, Japan; Hiroyuki Ito, Yokohama, Japan

[73] Assignee: Matsushita Electric Industrial Co., Ltd., Osaka, Japan

[21] Appl. No.: 354,743

[22] Filed: Dec. 8, 1994

Related U.S. Application Data

[63] Continuation of Ser. No. 58,058, May 7, 1993, abandoned.

[30] Foreign Application Priority Data

May 11, 1992 [JP] Japan ..................................... 4-117116

[51] Int. Cl.⁶ ............................................................. H04N 1/387
[52] U.S. Cl. ............................ 358/452; 358/404; 358/444
[58] Field of Search ..................................... 358/404, 444, 358/481, 452, 453

[56] References Cited

U.S. PATENT DOCUMENTS

| | | | |
|---|---|---|---|
| 4,782,397 | 11/1988 | Kimoto | 382/57 |
| 5,003,499 | 3/1991 | Fujiwara et al. | 364/523 |
| 5,084,760 | 1/1992 | Hashimoto et al. | 358/450 |
| 5,150,434 | 9/1992 | Hori et al. | 382/47 |
| 5,162,918 | 11/1992 | Muramatsu | 358/453 |
| 5,191,440 | 3/1993 | Levine | 358/450 |
| 5,199,081 | 3/1993 | Saito et al. | 382/47 |

FOREIGN PATENT DOCUMENTS

| | | |
|---|---|---|
| 57-104153 | 6/1982 | Japan . |
| 62-28729 | 2/1987 | Japan . |
| 0413156 | 1/1992 | Japan . |

Primary Examiner—Edward L. Coles, Sr.
Assistant Examiner—Thomas L. Stoll
Attorney, Agent, or Firm—Lowe, Price, LeBlanc & Becker

[57] ABSTRACT

An image editing apparatus includes a variable-sized image memory memorizing variable-sized image plane data, a variable-sized image plane administrator administering the size of the image plane data, and a variable-sized image editor editing the variable-sized image plane data.

11 Claims, 5 Drawing Sheets

IMAGE PLANE G

IMAGE PLANE G

IMAGE PLANE G          IMAGE PLANE G'

COPY

IMAGE PLANE G'

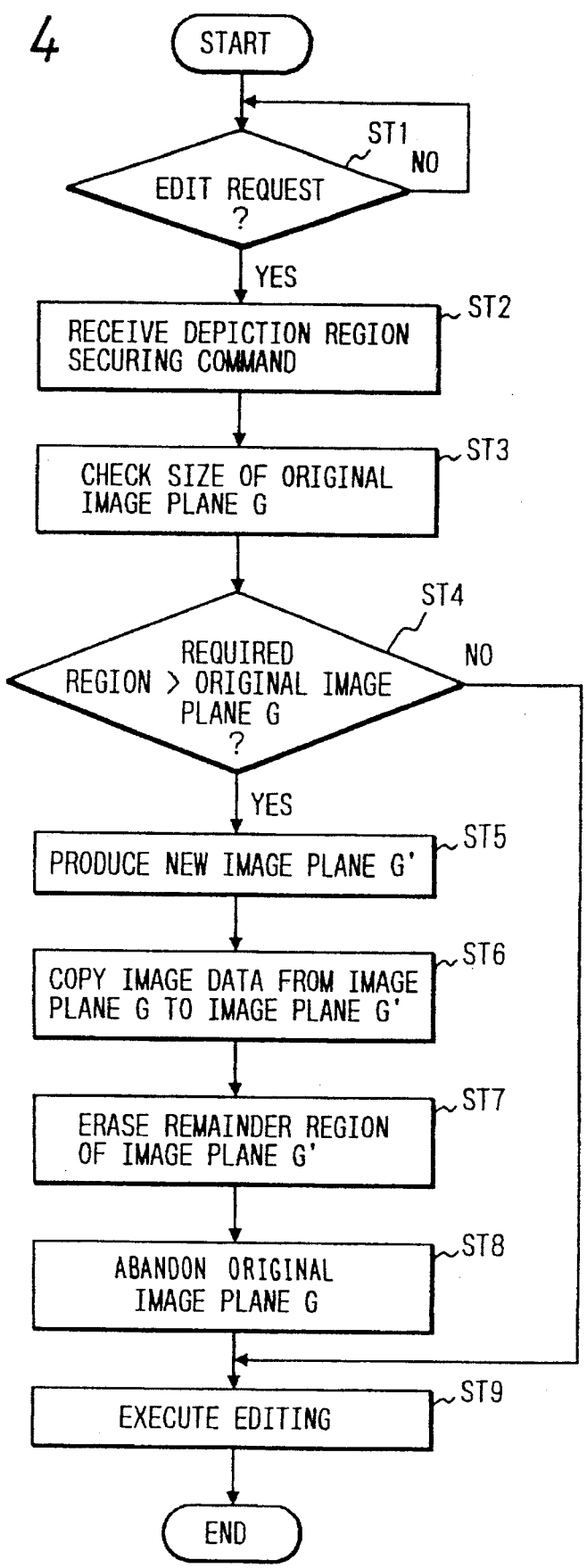

IMAGE MEMORY EDITING APPARATUS

This application is a continuation of application Ser. No. 08/058,058 filed May 7, 1993, now abandoned.

BACKGROUND OF THE INVENTION

1. Field of the Invention

The present invention relates to an interactive image processing system, and more particularly to an interactive image editing apparatus having flexible editing capability.

2. Description of the Prior Art

Recent development in information communication field has brought popularization of facsimile machines. As image data increases in its volume, image information transmitted through communication medium comes to be processed by electronic processing in view of re-use of data and saving of paper resources.

On the other hand, a conventional image editing apparatus could edit only fixed-sized image plane data. In other words, there was no image editing apparatus capable of editing variable-sized image plane data such as FAX transmitted or received data. Hereinafter, "variable-sized image plane" means that the size of the image plane is not fixed to a constant value.

In fact, image plane transmitted by a facsimile is not always the same length. Therefore, now required is an editing apparatus capable of adjusting the length of the image data or editing image data flexibly.

SUMMARY OF THE INVENTION

Accordingly, the present invention has a purpose, in view of above-described problem or disadvantage, to provide an image editing apparatus capable of editing variable-sized image plane data.

In order to accomplish the above purpose, the present invention provides a novel image editing apparatus comprising: a variable-sized image plane memory means for memorizing variable-sized image plane data; a variable-sized image plane administration means for administrating the size of said image plane data; and a variable-sized image plane editing means for editing said variable-sized image plane data.

With this arrangement the present invention allows the variable-sized image plane editing means to require the variable-sized image plane administration means to secure sufficient editing depiction region. In response to this request, the variable-sized image plane administration means adjusts the image plane to have enough space for original image plane data and image plane data newly added. Thereafter the variable-sized image plane editing means executes editing, thereby realizing an advanced editing apparatus applicable to a variable-sized image plane data.

The above and other objects, features and advantages of the present invention will become more apparent from the following detailed description which is to be read in conjunction with the accompanying drawings.

BRIEF DESCRIPTION OF THE DRAWINGS

FIG. 4 is a flowchart showing an image editing operation carried out in accordance with the present invention;

DETAILED DESCRIPTION OF THE PREFERRED EMBODIMENT

Hereinafter, with reference to accompanying drawings, a preferred embodiment of the present invention is explained in detail.

Figure 1:
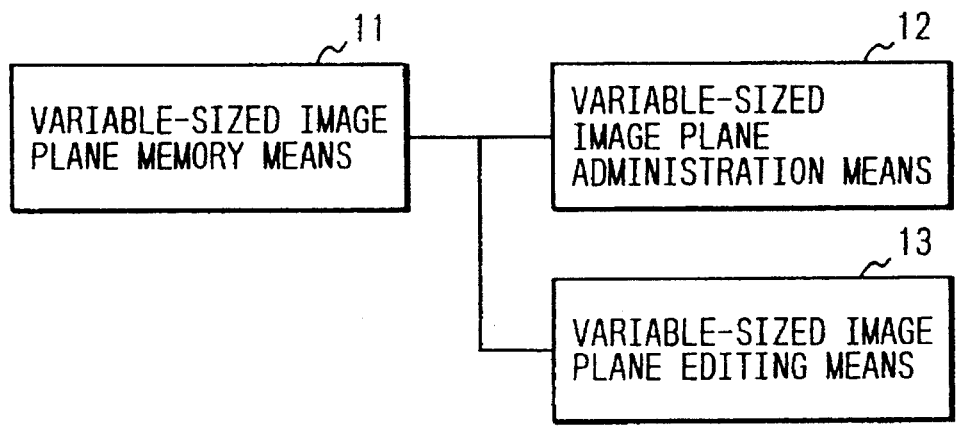
FIG. 1 is a block diagram functionally showing an image editing apparatus in accordance with the present invention.

In FIG. 1, a block 11 represents a variable-sized image plane memory means which memorizes a variable-sized image plane data, and a block 12 represents a variable-sized image plane administration means which administers the size of the variable-sized image plane data memorized in the variable-sized image plane memory means 11. And a block 13 represents a variable-sized image plane editing means which edits the variable-sized image plane memorized in the variable-sized image plane memory means 11.

Figure 2:
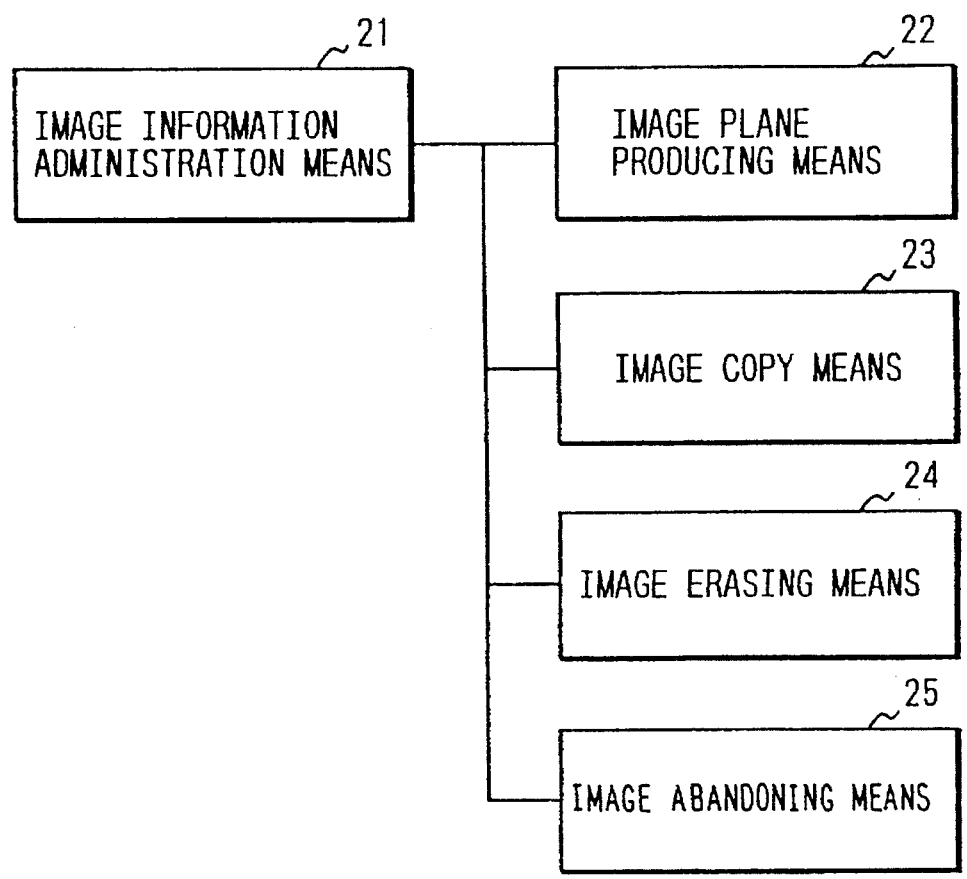
FIG. 2 is a block diagram showing details of a variable-sized image plane administration means, an essential part of the image editing apparatus.

In more detail the variable-sized image plane administration means 12 includes various functional sections disclosed in FIG. 2. A block 21 represents an image information administration means which administers overall largeness of image plane and requests securing a depiction region. A block 22 represents an image plane producing means which produces a new variable-sized image plane. A block 23 represents an image copy means which copies data from one image plane to another. A block 24 represents an image erasing means which erases data in the variable-sized image plane partly or entirely. A block 25 represents an image abandoning means which abandoned the variable-sized image plane.

Hereinafter, an operation of the editing apparatus of the present invention will be explained with reference to FIGS. 3(a) through 3(d).

Figure 3A:
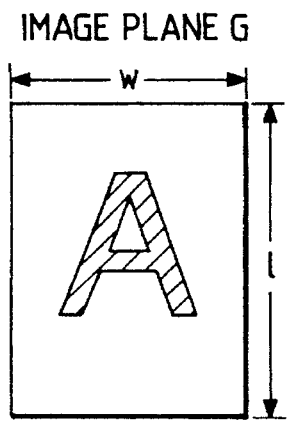
FIGS. 3(a) through 3(d) are views illustrating an operation of the image editing apparatus in accordance with the present invention.

The variable-sized image plane memory means 11 memorizes a variable-sized image plane G having the size of w in width and l in length as shown in FIG. 3(a). Now, the following explanation will be done by assuming a case where another character is depicted to protrude from the lower end of the image plane G by a length a.

First of all, if the variable-sized image plane editing means 13 sends a command of securing depiction region to the variable-sized image plane administration means 12, the image information administration means 21 in the variable-sized image plane administration means 12 checks the size of an original image plane stored in the variable-sized image plane memory means 11. As the requested depiction region protrudes out of the region of the original image plane in the example shown in FIG. 3(b), the image plane producing means 22 in the variable-sized image plane administration means 12 newly produces an image plane G' having a size w in width and l+a in length as shown in FIG. 3(c).

Figure 3B:
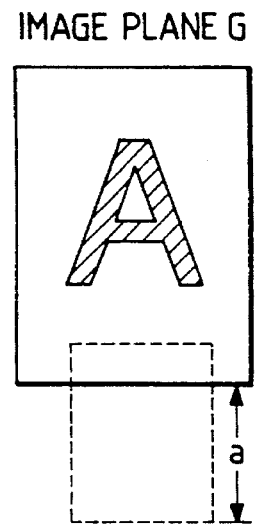
Figure 3C:
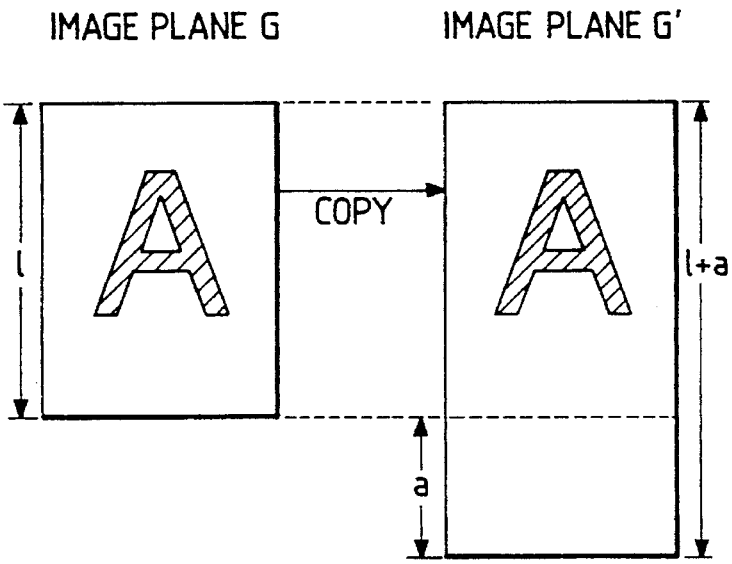

Subsequently, the image copy means 23 copies all the data involved in the original image plane G onto the newly produced image plane G' as shown in FIG. 3(c). Then, the remainder region of the image plane G' is erased by the image erasing means 24 and the original image plane G is abandoned by the image abandoning means 25, finally obtaining the image plane G' having the size of w in width and l+a in length. In this case, the remainder region corresponds to the region extended downward by the length a, which may be occupied by old data. Therefore, the erasing means 24 cleans up this region so as to erase all the old data.

Figure 3D:
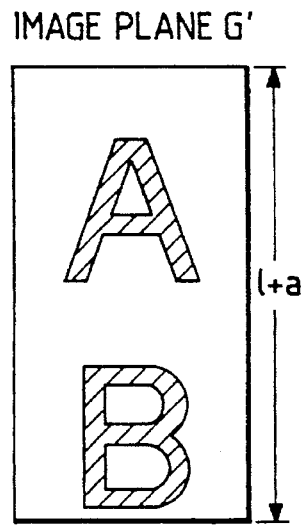

As the required depiction region has thus been obtained, the variable-sized image plane editing means 13 depicts the additional character as shown in FIG. 3(d) and accomplishes the editing to the variable-sized image plane.

As apparent from the foregoing description, the present invention can vary the size of an image plane as occasion demands, and therefore, provides an excellent image editing apparatus capable of flexibly editing data on the image plane without being adversely affecting by the size of the image plane data.

Figure 5:
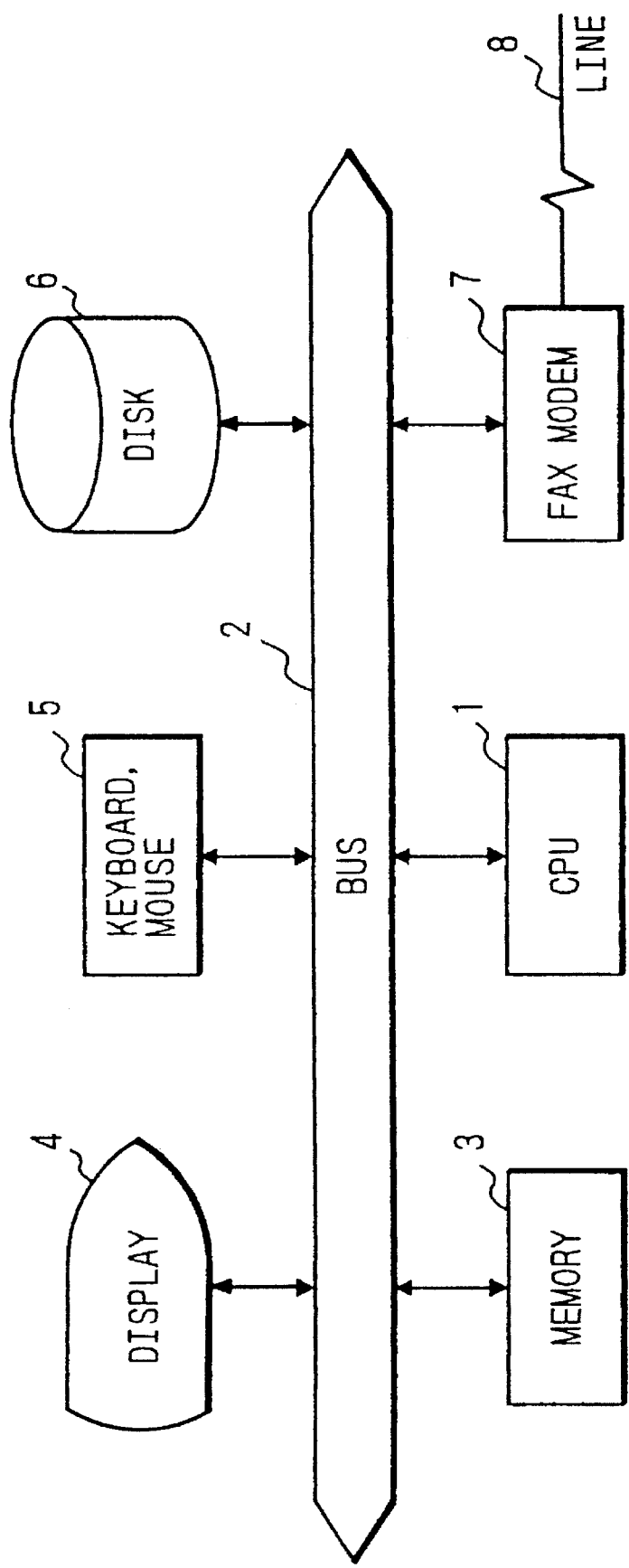
FIG. 5 is a block diagram showing an image editing system embodies the present invention.
Figure 6:
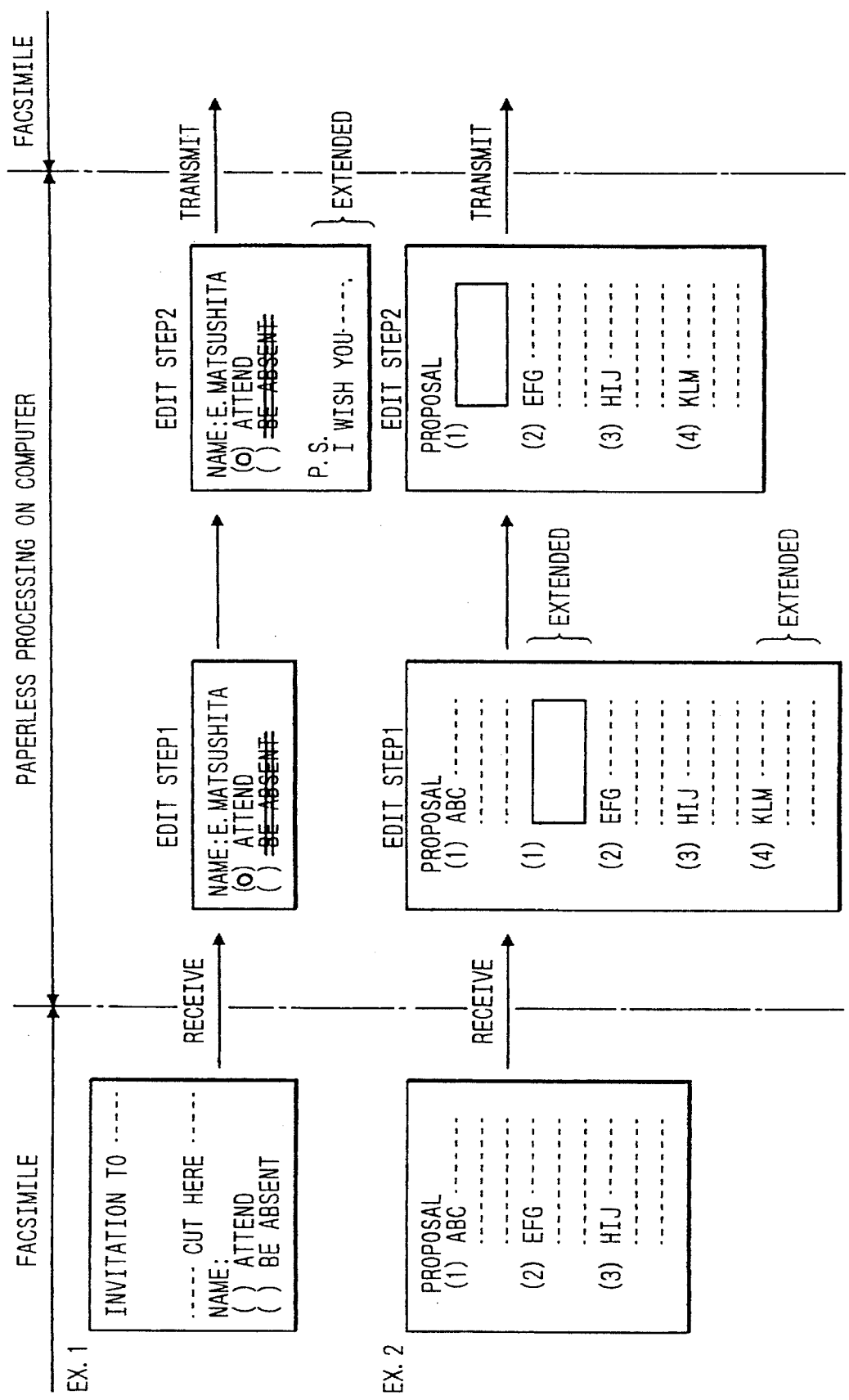
FIG. 6 is a view illustrating a paperless image editing operation carried out in accordance with the present invention.

FIG. 5 is a block diagram showing an overall system of an image editing apparatus which embodies the present invention. In FIG. 5, a reference numeral 1 represents a CPU which performs the editing processing and other processing. This CPU 1 is connected via a bus 2 to a memory 3, a display unit 4, a keyboard/mouse 5, a disk 6 and a FAX modem 7. The memory 3 temporarily memorizes an image plane to be edited. The display unit 4 displays this image plane on a display screen thereof. The keyboard/mouse 5 allows an operator to input various command and data while watching the display screen of the display unit 4. In other words, the display unit 4 and the keyboard/mouse 5 cooperate with each other to let an operator perform an interactive image editing operation. The disk 6 stores the image data. And the FAX modem 7 receives image data from other communication apparatus via line 8 or transmits image data vice versa.

In the editing operation, the CPU 1 reads out an image plane to be edited from the disk 6. The image plane having been read out is temporarily stored in the memory 3 and displayed on the display screen of the display unit 4, for standing by the image editing operation. An operator executes the editing operation by inputting editing command and data through the keyboard/mouse 5 while watching the display screen of the display unit 4. After completing the editing operation, an edited image plane is stored in the disk 6 and/or transmitted to other communication terminals through the FAX modem 7 and the line 8 as occasion demands.

Hereinafter, details of image editing operation carried out in the CPU 1 will be explained with reference to FIG. 4.

First of all, if an operator requests an image editing operation through the keyboard/mouse 5 in a step ST1, the CPU 1 proceeds to a step ST2 to receive a depiction region securing command. This depiction region securing command corresponds to the command fed from the above-described variable-sized image plane editing means 13 to the variable-sized image plane administration means 12. Namely, the keyboard/mouse 5 serves together with the CPU 1 as the variable-sized image plane editing means 13. The CPU 1 serves as the variable-sized image plane administration means 12.

Then in step ST3, the CPU 1 checks the size of an original image plane G which is presently memorized in the memory 3 and displayed on the display unit 4. The memory 3 serves as the variable-sized image plane memory means 11. And in a step ST4, the CPU 1 compares this original image plane G with the required depiction region.

If the required depiction region protrudes out of the original image plane G as shown in FIG. 3(b), the CPU 1 determines in the step ST4 that the required region is larger than the original image plane G.

Then the CPU 1 proceeds to a step ST5, in which an image plane is extended to provide a new image plane G' capable of completely accommodating both the original image plane G and the required depiction region.

Next in a step ST6, the CPU 1 copies the image data on the original image plane G to the newly produced image plane G'. Thereafter, the CPU 1 erases the remainder region of the image plane G' in a step ST7 and abandoned the original image plane G in a step ST8, so as to finally obtain the image plane G' as previously explained in the foregoing description with reference to FIGS. 3(b) and 3(c).

As the required depiction region has thus been secured, the CPU 1 allows the operator to initiate editing operation through the keyboard/mouse 5 in a step ST9.

As can be understood from above explanation, the CPU 1, chiefly executes these steps ST1 through ST9, serving as the image information administration means 21, the image plane producing means 22, the image copy means 23, the image erasing means 24, and the image abandoning means 25 above explained. However, it is needless to say that the CPU 1 needs to cooperate with other devices to perform respective functional operations. Therefore, it should be noted that above-described functional blocks 11 to 12 and 21 to 25 are not directly correspond to the devices 1 to 8 in FIG. 5.

By the way, if the required region is not larger than the original image plane G in the step ST4, the CPU 1 proceeds directly to the step ST9.

Thus, the new image plane edited in this manner is stored in the disk 8, which may serve as above-described variable-sized image plane memory means 11 together with the memory 3.

Next explained, with reference to FIG. 8, will be two specific examples of the editing operation in the facsimile communication, for making understanding easy.

In an example 1, a variable-sized image plane having been received through a facsimile is an invitation to e.g. an after-wedding celebration in which a sender asks a recipient as to whether he/she attends this celebration or not. This image plane is directly displayed on the display screen of the computer (i.e. image editing apparatus explained with reference to FIG. 5) without being printed out. Through the keyboard/mouse of the computer the recipient edits this image plane to write his/her name on it and mark "ATTEND" & delete "BE ABSENT" as shown in an edit step 1.

At the same time, an upper part of the original image plane is abandoned or deleted along the line indicated "CUT HERE" in this edit step 1. Then, the recipient varies the size of the image plane to extend it downward to make a short statement as shown in an edit step 2. When the editing operation is completed, the recipient transmits this image plane through the facsimile to reply the sender.

As can be understood from above explanation, no printing-out operation is required in this procedure. In other words, the present invention enables a paperless image editing processing on the computer. This will result in the saving of paper resources.

Next in an example 2, a variable-sized image plane having been received through the facsimile is a proposal consisting of a plurality of paragraphs. In order to revise some portions of this proposal the recipient first of all varies the size of the image plane to provide two extended regions, into which two paragraphs, i.e. a modified paragraph (1) and a new paragraph (4), are edited in an edit step 1. These newly added paragraphs may be image planes having been already stored in the disk of the computer. In this manner this invention allows an operator to re-use the previously stored image data.

Then, the original paragraph (1) is abandoned or deleted in an editing step 2 and thereafter transmitted to the sender through the facsimile.

That is, the present invention achieves the following electronic processing.

(1) Produce and revise an image plane on an electronic medium such as a computer in a paperless manner.

(2) Transmit and receive the image plane through the electronic medium such as a facsimile associated with the computer.

(3) Store the image plane in the electronic medium such as a disk equipped in the computer and re-use it.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such meets and bounds are therefore intended to embraced by the claims.

What is claimed is:

1. An image editing apparatus comprising:

image plane memory means for memorizing an image plane having a designated original size, said image plane occupying a continuous region in said image plane memory;

image plane editing means for checking whether the designated original size of the memorized image plane is adequately large to conform with a required editing operation for newly adding an image to said memorized image plane and, when the designated original size of said memorized image plane is determined by said image plane editing means to be inadequate for the required editing operation, for autonomously generating a request for adding to said memorized image plane an additional editing region having a size proportional to a volume of the image to be newly added to said memorized image plane; and image plane administration means for responding to said request from said image plane editing means and initiating creation of a new image plane, having a new size, larger than said designated original size, by:

adding a new editing region having a designated editing size proportional to the volume of the image to be newly added at a designated position of said memorized image plane without overwriting said memorized image plane, and then by replacing said memorized image plane having the designated original size by said new image plane having the new, larger, size;

said image plane editing means editing said new editing region added by said image plane administration means for finally creating a renewed image plane having the new, larger, size.

2. An image editing apparatus in accordance with claim 1, wherein said image plane administration means includes image information administration means for administering overall largeness of the image plane and requesting to secure a depiction region to the image plane.

3. An image editing apparatus in accordance with claim 1, wherein said image plane administration means includes image plane producing means for producing said new image plane.

4. An image editing apparatus in accordance with claim 1, wherein said image plane administration means includes image copy means for copying data from one image plane to another.

5. An image editing apparatus in accordance with claim 1, wherein said image plane administration means includes image erasing means for erasing data in the image plane having the designated original paper size.

6. An image editing apparatus in accordance with claim 1, wherein said plane administration means includes image abandoning means for abandoning the image plane having the designated original paper size.

7. An image editing apparatus in accordance with claim 1, wherein said renewed image plane is transmitted by a facsimile equipment.

8. An image editing apparatus comprising:

image plane memory means for memorizing an image plane having a designated original size;

image plane editing means for responding to an image editing request for deleting an image from said memorized image plane by autonomously generating a request for deleting a portion of an editing region of said memorized image plane, said portion having a size proportional to a volume of the image to be deleted from said memorized image plane; and image plane administration means for responding to said request from said image plane editing means and initiating creation of a new image plane, having a new size, smaller than said designated original size, by:

deleting a part of the editing region, said part of the editing region having a designated editing size proportional to the volume of the image to be deleted from said memorized image plane at a designated position of said image plane, and then by replacing said memorized image plane having the designated original size by said new image plane having the new, smaller, size, for finally creating a renewed image plane having the new, smaller, size.

9. An image editing apparatus in accordance with claim 8, wherein said renewed image plane is transmitted by a facsimile equipment.

10. An image editing apparatus comprising:

image plane memory means for memorizing an image plane, said memorized image plane including a first image;

wherein said first image has a first size and said memorized image plane has a first plane size;

said memorized image plane occupying a continuous region in said image plane memory means;

image plane editing means for retaining said first image at said first size when responding to an image editing request for adding a new image to the memorized image plane;

said image plane editing means responding to said image editing request by determining whether the image plane is sufficiently large to include the new image and, if not, by autonomously generating a request for adding to the memorized image plane an additional editing region proportional to a size of the new image to be added thereto;

said image plane editing means generating said request independently of any request to enlarge the memorized image plane;

image plane administration means for responding to said request from said image plane editing means by:

adding a new editing region, having a size established by said image plane administration means to be proportional to the size of the new image to be added in order to produce a new image plane having a second plane size larger than the first plane size of said memorized image plane; and by replacing said memorized image plane, having said first plane size, by said new image plane having said second plane size and occupying a continuous region of said image plane memory means, while not overwriting the presently memorized image plane;

wherein said image plane editing means edits said new editing region added by said image plane administration means for creating said new image plane having said second plane size and for retaining said first image at said first size.

11. An image editing apparatus comprising:

image plane memory means for memorizing an image plane, said memorized image plane including a first image;

wherein said first image has a plurality of portions having respective original sizes and said memorized image plane has a first plane size;

image plane editing means for retaining remaining ones of said plurality of portions at said respective original sizes thereof when responding to an image editing request for deleting a portion of said first image from the memorized image plane;

said image plane editing means responding to said image editing request by autonomously generating a request for deleting from the memorized image plane a part of an editing region having a size proportional to the original size of the portion of said first image to be deleted therefrom;

said image plane editing means generating said request independently of any request to change the first plane size of said memorized image plane;

image plane administration means for responding to said request from said image plane editing means by:

deleting said part of said editing region, having a size established by said image plane administration means to be proportional to the size of the portion of said first image to be deleted in order to produce a new image plane having a second plane size smaller than the first plane size of said memorized image plane; and by replacing said memorized image plane, having said first plane size, by said new image plane having said second plane size, thereby creating said new image plane having said second plane size and retaining said first image at said first size.

* * * * *